US007831467B1

(12) United States Patent
Lefebvre et al.

(10) Patent No.: US 7,831,467 B1
(45) Date of Patent: Nov. 9, 2010

(54) METHOD AND SYSTEM FOR RETAINING CUSTOMER LOYALTY

(75) Inventors: Christopher R. Lefebvre, Landenberg, PA (US); Christopher James Konen, Sr., Hockessin, DE (US); Matthew Joseph Keane, Medford, NJ (US); Elissa Budischak, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 2449 days.

(21) Appl. No.: 09/688,694

(22) Filed: Oct. 17, 2000

(51) Int. Cl.
*G06Q 30/00* (2006.01)

(52) U.S. Cl. .......................................... 705/14; 379/111

(58) Field of Classification Search .................. 705/35, 705/14
See application file for complete search history.

(56) References Cited

U.S. PATENT DOCUMENTS

| 1,245,531 | A | 11/1917 | Tinsley |
| 2,152,079 | A | 3/1939 | Mott |
| 2,986,144 | A | 5/1961 | Shepard |
| 4,254,474 | A | 3/1981 | Elbaum et al. |
| 4,355,372 | A | 10/1982 | Goldberg et al. |
| 4,723,212 | A | 2/1988 | O'Brien et al. |
| 4,760,604 | A | 7/1988 | Cooper |
| 4,897,811 | A | 1/1990 | Scofield |
| 4,906,826 | A | 3/1990 | Spencer |
| 4,908,761 | A | 3/1990 | Tai |
| 4,910,672 | A | 3/1990 | Off |
| 4,958,375 | A | 9/1990 | Reilly |
| 4,972,504 | A | 11/1990 | Daniel |
| 5,041,972 | A | 8/1991 | Frost |
| 5,128,752 | A | 7/1992 | Von Kohorn |
| 5,173,851 | A | 12/1992 | Off |
| 5,201,010 | A | 4/1993 | Deaton |
| 5,233,514 | A | 8/1993 | Ayyoubi |
| 5,250,789 | A | 10/1993 | Johnsen |
| 5,253,066 | A | 10/1993 | Vogel |
| 5,260,778 | A | 11/1993 | Kauffman |
| 5,278,751 | A | 1/1994 | Adiano |
| 5,287,268 | A | 2/1994 | McCarthy |
| 5,297,026 | A | 3/1994 | Hoffman |

(Continued)

OTHER PUBLICATIONS

Gasner, Steve. Forging a Link Between Retention and Profits. Apr. 1992. Credit Card Management. vol. 5. Issue 1. p. 84.*

(Continued)

*Primary Examiner*—Namrata Boveja
(74) *Attorney, Agent, or Firm*—Hunton & Williams, LLP

(57) ABSTRACT

A system and method for providing incentives to customers where the incentives are tailored to the customer's needs and expectations while achieving profitability to the provider are presented. The present invention determines a set of incentives based on customer segmentation, card segmentation, call type as well as other factors. Upon receiving a request for termination or other request, the customer may be routed to an appropriate person, department, or group. Information regarding the account may be identified and retrieved and the customer may be verified. Based on customer payment history and other information, the customer segment may be identified. Incentives are then determined based on customer segmentation data, product information, and call type. These incentives are offered to the customer for approval. If the customer does not accept the incentive, other sales opportunities may be offered to the customer in an effort to retain customer loyalty.

16 Claims, 8 Drawing Sheets

U.S. PATENT DOCUMENTS

| | | |
|---|---|---|
| 5,331,544 A | 7/1994 | Lu |
| 5,343,239 A | 8/1994 | Lappington |
| RE34,915 E | 4/1995 | Nichtberger |
| 5,442,567 A | 8/1995 | Small |
| 5,444,844 A | 8/1995 | Inoue |
| 5,488,423 A | 1/1996 | Walkingshaw |
| 5,490,060 A | 2/1996 | Malec |
| 5,491,838 A | 2/1996 | Takahisa |
| 5,500,681 A | 3/1996 | Jones |
| 5,504,519 A | 4/1996 | Remillard |
| 5,513,102 A | 4/1996 | Auriemma |
| 5,513,117 A | 4/1996 | Small |
| 5,563,933 A | 10/1996 | August |
| 5,564,073 A | 10/1996 | Takahisa |
| 5,570,295 A | 10/1996 | Isenberg |
| 5,576,951 A | 11/1996 | Lockwood |
| 5,581,064 A | 12/1996 | Riley |
| 5,603,025 A | 2/1997 | Tabb |
| 5,612,868 A | 3/1997 | Off |
| 5,642,279 A | 6/1997 | Bloomberg |
| 5,642,485 A | 6/1997 | Deaton |
| 5,644,723 A * | 7/1997 | Deaton et al. ................ 705/14 |
| 5,649,114 A | 7/1997 | Deaton |
| 5,671,267 A | 9/1997 | August |
| 5,671,409 A | 9/1997 | Fatseas |
| 5,682,524 A | 10/1997 | Freund |
| 5,687,322 A | 11/1997 | Deaton |
| 5,689,100 A | 11/1997 | Carrithers |
| 5,715,402 A | 2/1998 | Popolo |
| 5,721,831 A | 2/1998 | Waits |
| 5,749,178 A | 5/1998 | Garmong |
| 5,765,143 A | 6/1998 | Sheldon |
| 5,765,144 A | 6/1998 | Larche |
| 5,787,403 A | 7/1998 | Randle |
| 5,794,178 A | 8/1998 | Caid |
| 5,794,207 A | 8/1998 | Walker |
| 5,822,410 A * | 10/1998 | McCausland et al. .. 379/114.01 |
| 5,832,457 A | 11/1998 | O'Brien |
| 5,857,175 A | 1/1999 | Day |
| 5,873,096 A | 2/1999 | Lim |
| 5,884,278 A | 3/1999 | Powell |
| 5,930,764 A | 7/1999 | Melchione |
| 5,940,811 A | 8/1999 | Norris |
| 5,945,653 A | 8/1999 | Walker et al. |
| 5,950,173 A | 9/1999 | Perkowski |
| 5,970,467 A | 10/1999 | Alavi |
| 5,974,396 A | 10/1999 | Anderson |
| 5,974,399 A | 10/1999 | Giuliani et al. |
| 5,995,942 A | 11/1999 | Smith |
| 6,009,415 A * | 12/1999 | Shurling et al. ................ 705/35 |
| 6,014,645 A | 1/2000 | Cunningham |
| 6,026,370 A | 2/2000 | Jermyn |
| 6,029,139 A | 2/2000 | Cunningham |
| 6,032,125 A | 2/2000 | Ando |
| 6,055,510 A | 4/2000 | Henrick |
| 6,055,513 A * | 4/2000 | Katz et al. .................... 705/26 |
| 6,061,660 A * | 5/2000 | Eggleston et al. ............. 705/14 |
| 6,070,147 A | 5/2000 | Harms |
| 6,073,105 A | 6/2000 | Sutcliffe |
| 6,078,892 A | 6/2000 | Anderson |
| 6,161,128 A * | 12/2000 | Smyk ........................ 709/205 |
| 6,236,978 B1 | 5/2001 | Tuzhilin |
| 6,611,811 B1 * | 8/2003 | Deaton et al. ................. 705/14 |

OTHER PUBLICATIONS

PCT-International Search Report dated Jan. 22, 2001 for Application Serial No. PCT/US01/32144.

Salesforce Automation/Customer Relationship Management, Computer Telephony Specialist, May 25, 1999.

Craig Stedman, Utilities, telcos seek marketing edge, Computer World, vol. 32, No. 16, pp. 20, Apr. 20, 1998.

* cited by examiner

METHOD AND SYSTEM FOR RETAINING CUSTOMER LOYALTY

FIELD OF THE INVENTION

The invention relates to a system and method for retaining customer loyalty by presenting incentives that are tailored to a particular customer and profitable to the provider. More particularly, the invention relates to a system and method that presents incentives and sales opportunities based on customer segmentation, product segmentation, call type and other criteria for the purpose of retaining customer loyalty.

BACKGROUND OF THE INVENTION

Traditionally, service and product providers, including banks and other financial institutions, have attempted to retain all customers at whatever the costs. Without regard to the customer's characteristics and profitability to the provider, service and product providers have made efforts to retain even the most delinquent customers. In most instances, the same offer is presented to all customers. This type of retention effort often results in lower profitability to the provider.

Currently, there are many different types of banking related products and services offered to customers. Different individuals are attracted to different products and have varying needs and expectations. For example, a single college student may acquire a credit card for emergency purposes and regular school expenses. The student's parents may even pay the bill for the student. On the other hand, a parent of four children may have several credit cards, a mortgage, loans, retirement funds, and several college funds. Without knowledge of the customer's spending habits and demographics, it becomes more difficult to present incentives that effectively retain customers.

Due to changing circumstances, customer need, and fierce competition among other providers, there may be a high rate of termination in response to more attractive incentives offered by competitors. If a current provider is not adequately meeting the needs of its customers, the customer may build associations elsewhere when confronted with an attractive incentive or offer. In other instances, a customer may initiate termination due to dissatisfied service and lack of customer satisfaction. Generally, it is beneficial for the provider to retain current customers for the purpose of building recognition and loyalty. Also, long-term customer loyalty establishes a strong presence in the industry as well as a prominent reputation. However, in other instances, when a customer becomes unacceptably delinquent in payments or otherwise unprofitable, it may be economically detrimental for the provider to maintain relations with this customer. Thus, efforts to retain customers are partially motivated by the customer's behavior and attributes.

When a provider is confronted with a request to terminate, the provider may present numerous types of offers or promotions in an effort to retain that customer. However, without becoming familiar with a customer's buying habits or attributes, presentment of offers may not be well received by the customer. An incentive presented by the provider may be attractive to one group of customers while another group of customers may have little or no interest in the presented incentive. Also, different types of products may yield different needs and expectations from customers. Further, based on the type of call and the customer's objectives, a customer may be more or less willing to continue association with a particular provider.

Therefore, the chances of retaining a customer in response to a request to terminate are significantly lower when customer related factors are not readily available or properly segmented. Other problems and drawbacks exist with current systems.

SUMMARY OF THE INVENTION

An object of the invention is to overcome the aforementioned and other drawbacks.

Another object of the invention is to provide a system and method for retaining customer loyalty.

Another object of the invention is to provide a system and method for presenting incentives to customers based on customer characteristics.

Another object of the invention is to provide a system and method for presenting incentives to customers based on the customer's product (e.g., card) characteristics.

Another object of the invention is to provide a system and method for presenting incentives to customers based on the customer's call type.

Another object of the invention is to provide a system and method for presenting incentives to customers based on customer characteristics, product characteristics, and call type.

To achieve these and other objects, and in accordance with the purpose of the invention, as embodied and broadly described, an embodiment of the invention comprises a system and method for retaining customer loyalty. The present invention presents incentives to customers where the incentives are tailored to the customer's needs and expectations while maintaining profitability for the provider. The present invention determines a set of incentives based on customer segmentation, card segmentation, call type as well as other factors.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof, as well as the appended drawings.

DETAILED DESCRIPTION OF THE INVENTION

The invention is directed to a system and method for retaining customer loyalty. According to an embodiment, the invention may be utilized by a financial institution. A system and method for providing incentives to customers where the incentives are tailored to the customer's needs and expectations while achieving profitability to the provider are presented. The present invention determines a set of incentives based on customer segmentation, card segmentation, and call type, as well as other factors.

Figure 1:
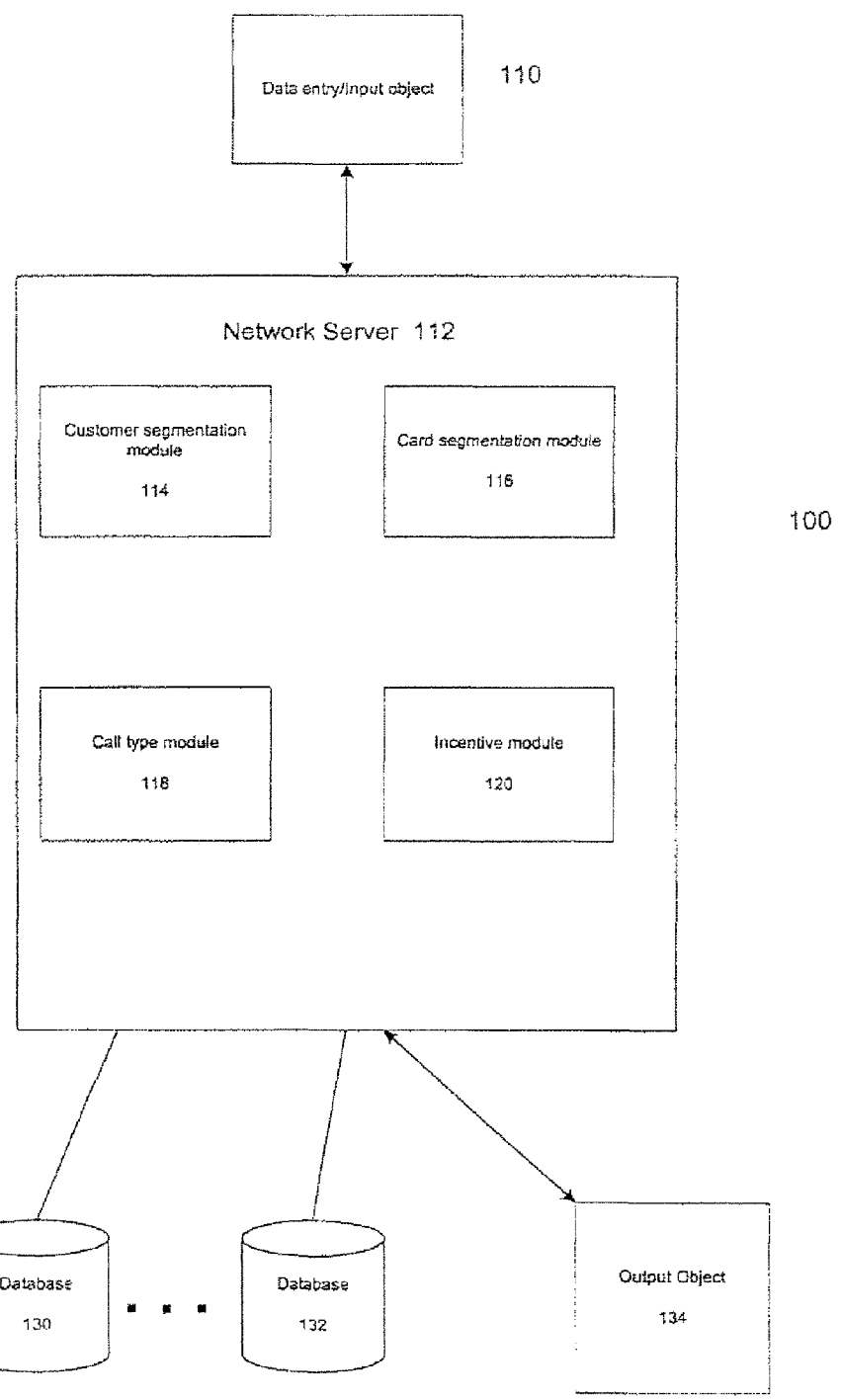
FIG. 1 is a block diagram of a system in accordance with an embodiment of the present invention.

According to an embodiment, the system and method of the present invention may be accomplished by a system shown in FIG. 1. Referring to FIG. 1, system 100 may include Data Input Object 110, Databases 130 and 132, Network Server 112 and Output Object 134. Data Input Object 110 operates to receive input from a variety of sources. Data Input Object 110 may encompass any device capable of inputting and receiving data, such as, but not limited to, input by way of a keyboard, keypad, coding mechanism, voice recognition, or any other electronic method. Data Input Object 110 may include a keyboard or mouse operatively connected to a computer terminal with a display, where the computer functions as part of a client-server computer network.

Data received by Data Input Object 110 is relayed to Network Server 112 which may store, compile and process various system modules and data. As shown in FIG. 1, according to an embodiment of the present invention, Network Server 112 may include Customer Segmentation Module 114, Card Segmentation Module 116, Call Type Module 118, and Incentive Module 120. Other modules and functions may also be included. Notably, this architecture is exemplary only and the system of the present invention may be implemented in a variety of different computer network types. For example, Customer Segmentation Module 114, Card Segmentation Module 116, Call Type Module 118, Incentive Module 120 may reside on a stand alone computer which itself is operatively connected to Databases 130 and 132 and other system components shown and not shown. Also, for example, the system and method may be operated in an Internet-related environment where many or all of the system components discussed herein reside on or may be accessed by the way of the Internet.

Network Server 112 may interact with Databases 130, 132, Output Object 134 and other components comprising or connected to the system, such as other servers and data terminals within the system, or other computer or telecommunications networks including the Internet. Databases 130 and 132 may store data for the operation of the system. These databases may comprise any medium capable of storing electronic data, including, but not limited to, databases, RAM, cache, CD or magnetic disk, or any combination thereof. According to an embodiment of the present invention, system 100 may encompass a number of storing object databases which interact and exchange information and data with Network Server 112. For example, Database 130 may store information related to accounts and Database 132 may store information related to incentives, such as history, summary and availability information. Other databases may also be used to store other relevant information.

Output Object 134 may encompasses any device capable of outputting or transmitting data in any form. As such, Output Object 134 may include a printer, computer or computer display, modem, facsimile transmission or any other electronic or telecommunication device which performs a similar or related function. Notably, when Data Input Object 110 includes a display, it may also function as an output object.

Figure 2:
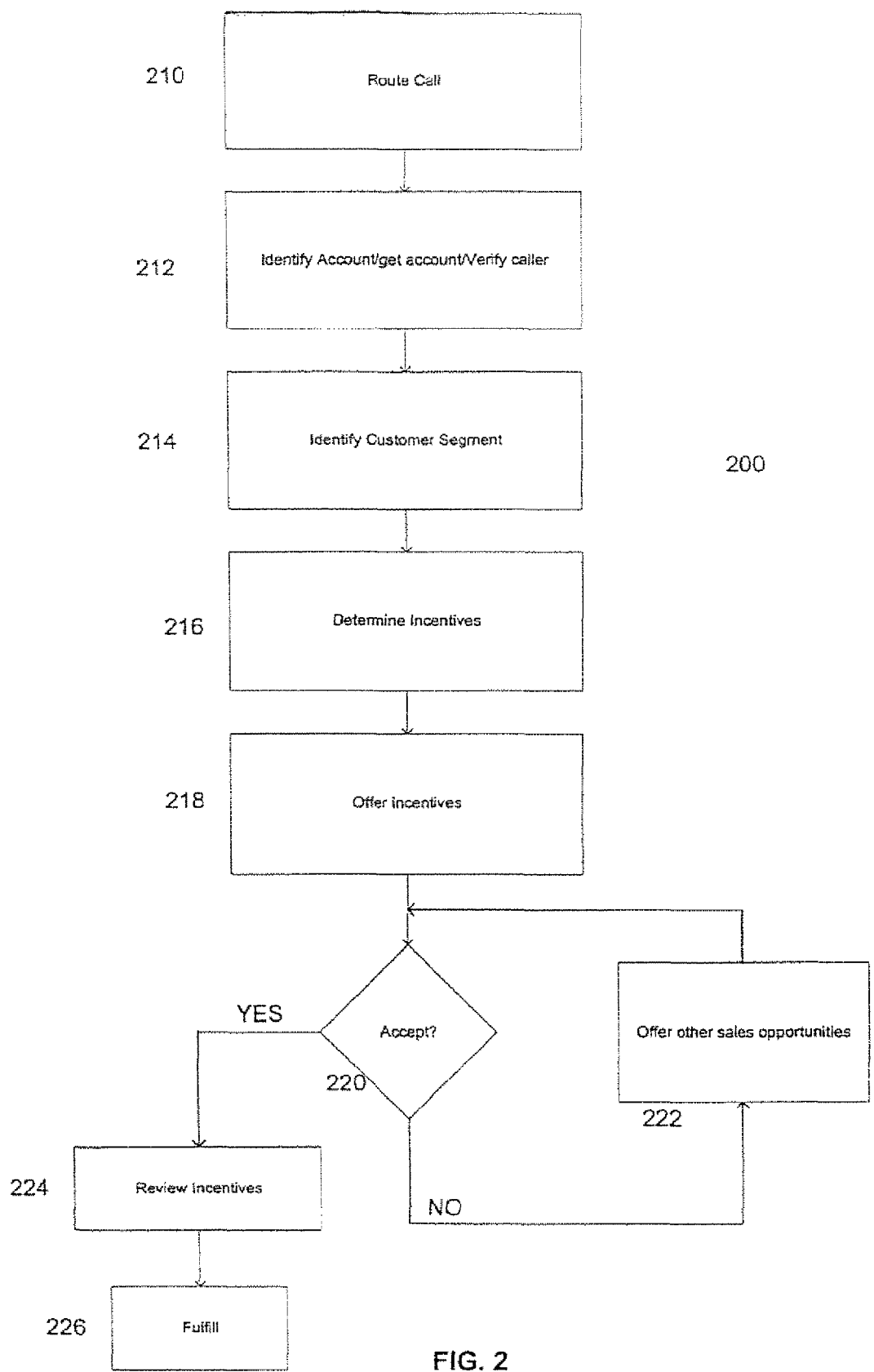
FIG. 2 is a flowchart for a retention request process in accordance with an embodiment of the invention.

FIG. 2 is an example of a flowchart for a retention request process 200 in accordance with an embodiment of the invention. A customer may initiate a communication with an entity, such as a financial institution, to terminate services or inquire about promotions/incentives or other services or products. The communication may be a telephone conversation, a correspondence over the Internet, or other form of communication. In other instances, a request for termination may arise in response to a financial institution's initiative. Upon receiving a request for termination or other request, the customer may be routed to an appropriate person, department, or group, at step 210. Information regarding the account may be identified and retrieved and the customer may be verified, at step 212. Based on customer characteristics and other information, the customer segment may be identified at step 214. Incentives are then determined based on various factors which may include customer segmentation, at step 216. The customer may be offered the incentives at step 218. If the offer is accepted, the incentives may then be reviewed with the customer, at step 224. The accepted one or more offers may be fulfilled, at step 226. However, if the customer does not accept the incentive, other sales opportunities may be offered to the customer, at step 222. This process may continue until the customer accepts an incentive or until either party exits. For example, the customer may find the incentives unacceptable. Also, the provider may find it unprofitable to further attempt to retain the customer.

Referring to step 210, a customer's call may be routed or directed to an appropriate group for customized assistance based on the customer's characteristics, the product or other factors. One group may handle customers based on the card status or other attributes. For example, if a card is identified as delinquent, a collections organization or group may address customers associated with these cards. Another group may handle customers associated with a particular product segment. For example, a card segment may be based on the type of card, such as an airline, military, business, or merchant card. To assist customers with language and other barriers, another group may specialize in a foreign language, such as Spanish, Chinese, etc. Other specialized groups may also be made available.

Figure 3:
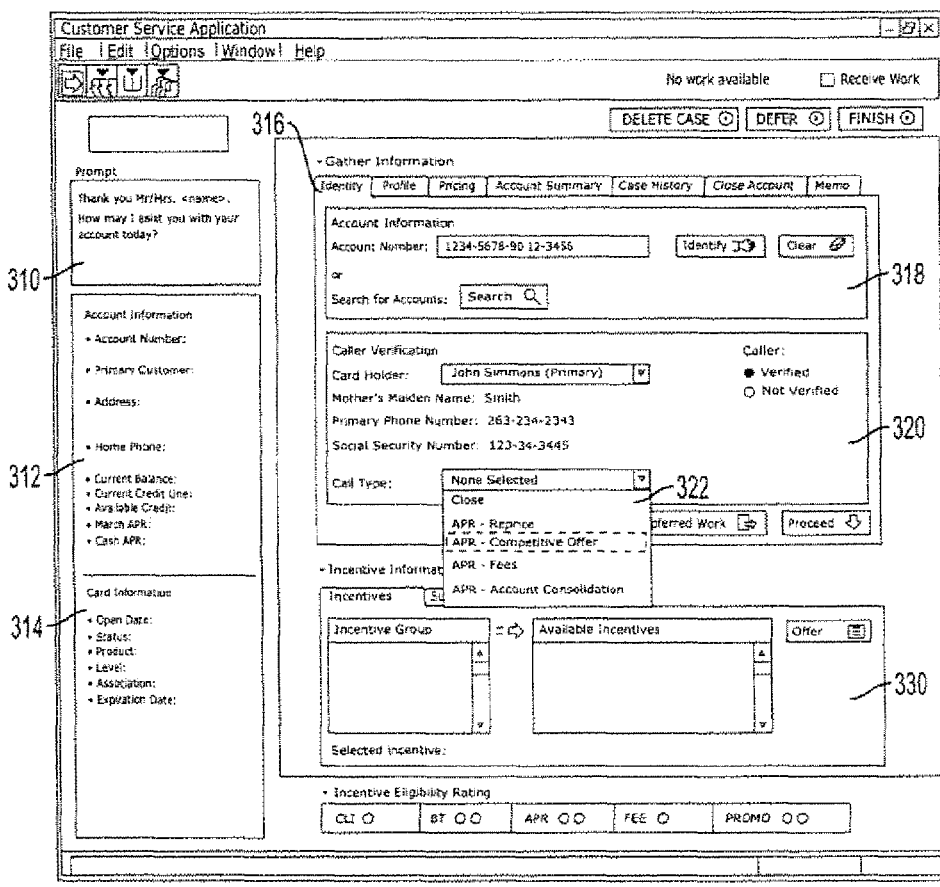
FIG. 3 illustrates an example of a GUI containing an identification feature in accordance with an embodiment of the invention.

Referring to step 212, account information may be identified, retrieved, and verified, as shown in FIG. 3. Account information may be displayed on a provider representative's computer screen as part of a graphical user interface (GUI). By selecting Identify Tab 316, an Account Information Box 318 and a Caller Verification Box 320 may be displayed. The customer may provide an account number or other identifier, which may be entered in Account Information Box 318. When an identify button is selected, the associated account information may be displayed in Caller Verification Box 320. By retrieving the account, additional account related information may also be obtained, such as pricing information, payment history, statements, fees and other information. Also, a different account may be used as the basis for the call, at the customer's request.

Figure 4:
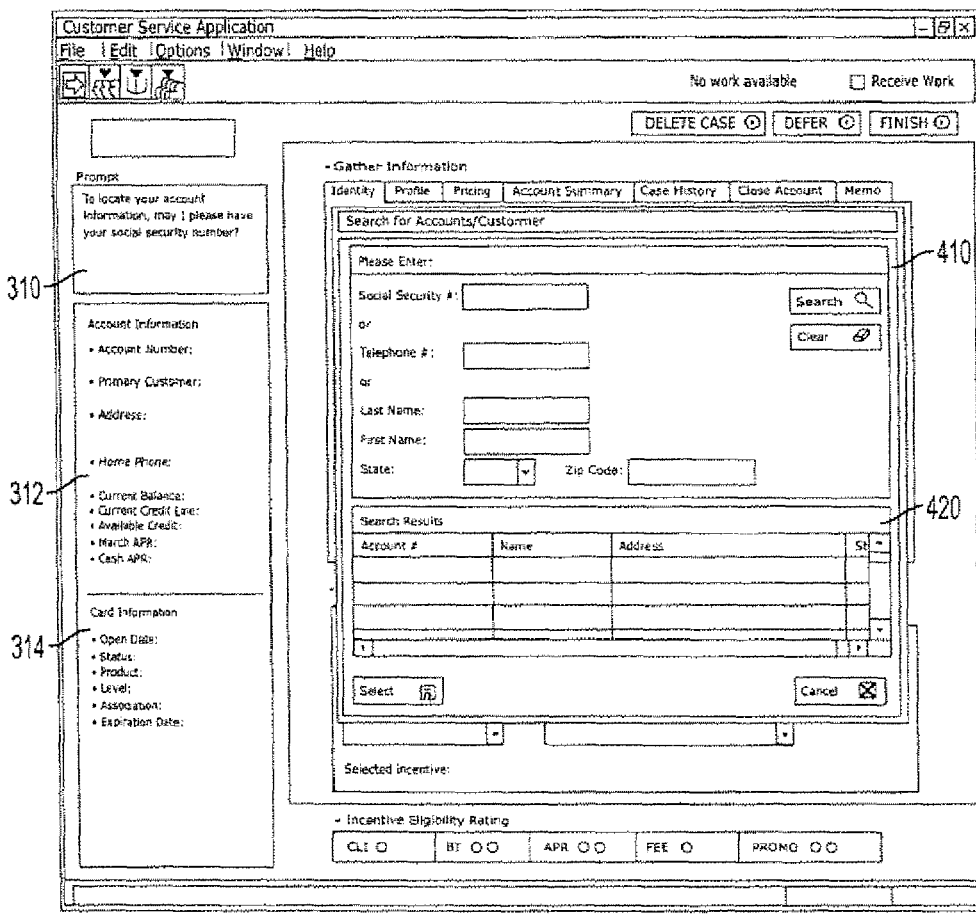
FIG. 4 illustrates an example of a GUI containing a search feature in accordance with an embodiment of the invention.

There may be instances where the customer is unable to supply the account number. The system may search for the account number or other identifier based on other personal information. FIG. 4 illustrates an example of a GUI displaying a search screen according to an embodiment of the present invention. For example, the customer may supply other identifiers, such as social security number, telephone number, last name, first name, and other personal information in the search for Account/Customer Box 410. Search results may display multiple accounts with the similar entries in Search Result Box 420. By scrolling down the list of possible entries, the correct account may be selected.

As shown in Caller Verification box 320 in FIG. 3, the customer may be verified for security purposes and other reasons. The caller may be identified as a primary, secondary, authorized user, third party, or other entity. Based on the role of the caller, certain limits or restrictions may apply with regards to the type of action that the caller may initiate. Caller verification may be established by confirming the mother's maiden name of the primary account holder or through other verification means, such as a unique answer to specific question. The caller may also be asked to verify the primary phone number, social security number or other personal information.

After account information is retrieved, displayed and verified, the provider representative may engage the customer in a discussion to ascertain information that may be relevant in determining the most profitable and attractive incentives to the customer. Prompt box 310 may provide guidance to the provider representative in eliciting pertinent information. Based on the relevant information, the provider representative may classify the customer's situation according to a plurality of predetermined call categories, or call types, as shown by Call Type drop down window 322. The call type that most accurately describes the caller's situation may be selected. This information, along with other customer information, is then used to determine a profitable and effective incentive that promotes customer loyalty. Call type selections 322 may include close; APR—Reprice; APR—Competitive Offer; APR—Fees; APR—Account Consolidation; and other call type selections. After the caller is properly identified, a list of possible incentives may be presented in Incentives box 330. When the caller is properly verified, the provider representative may begin offering incentives to the customer and perform other operations.

Referring to step 214, the customer may be categorized into a specific customer segment to ensure that the most optimal offers are presented to the customer. Customer segmentation may be based on characteristics of the customer, such as paying habits and payment history. Customer segmentation may involve assigning a numerical value to a customer. Other values may also be used such as symbols, letters, etc. This value may be based on various customer attributes, such as behavior segment value, credit bureau score, profit sight score, profitability score, attrition score, delinquency days and other factors.

Figure 5:
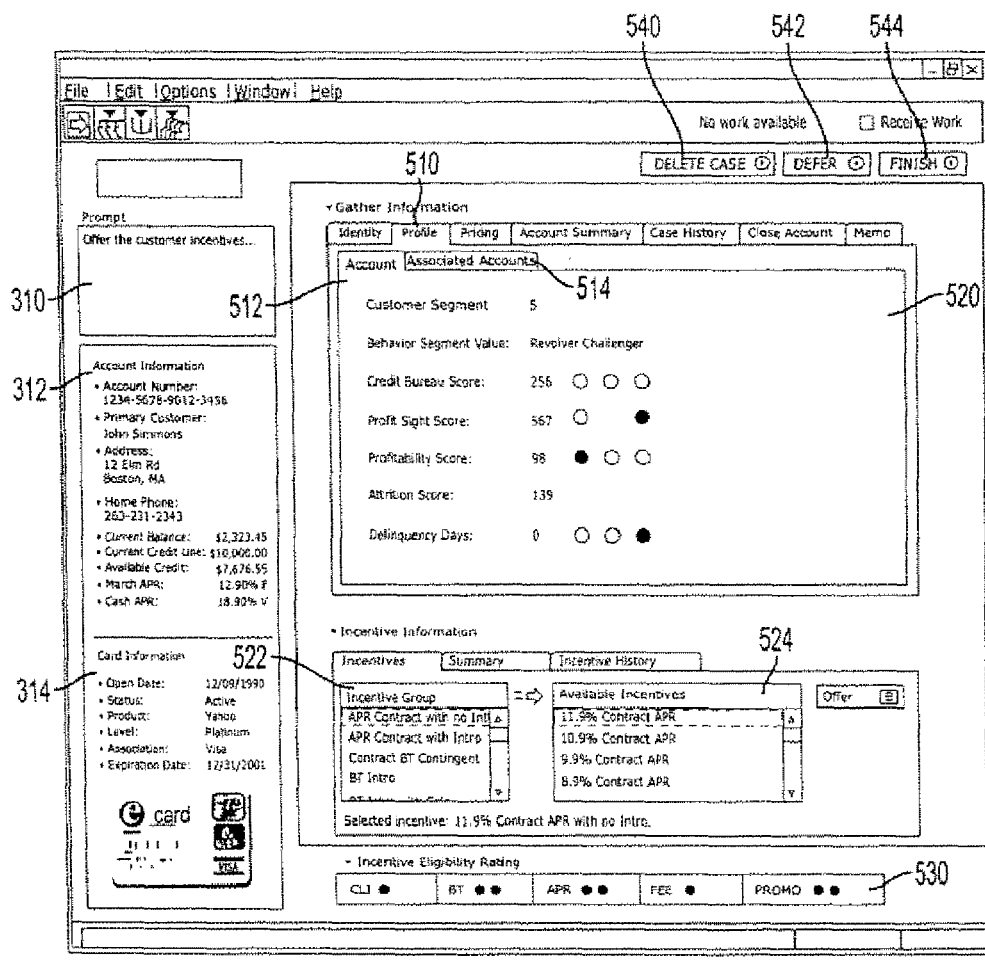
FIG. 5 illustrates an example of a GUI containing profile information in accordance with an embodiment of the invention.

FIG. 5 illustrates an example of a GUI displaying customer profile information according to an embodiment of the present invention. By selecting Profile Tab 510, profile details of the customer's accounts may be displayed. By selecting Account Tab 512, customer characteristic information for the current account may also be displayed. Other associated accounts under Tab 514 may also be accessed. In this example, the customer has been assigned a customer segment value of 5. This value is based on various customer attribute information. For instance, this customer has been assigned a behavior segment label of Revolver Challenger. Various scores may be provided for factors as well as color-coded indicators. For instance, this customer's Credit Bureau Score is 256 where a yellow caution circle may be assigned to warn the provider representative to proceed with caution. Similarly, this customer's profitability score may be assigned a red circle signifying that this customer is not a profitable customer. However, the profit sight score and delinquency days may be assigned a green circle which indicates that the customer has scored favorably in these areas. These factors indicate risk of flight, profitability and other characteristics that assist in determining which incentives to offer the customer. These factors further assist in determining whether any incentives are to be offered at all. Other visual aids may be employed. For instance, a wider range of colors may be used to provide a more graded set of indicators. Also, a single color change may be used to signify a clear approval or rejection.

Referring to step 216, incentives to be offered to the customer may be determined from an incentive matrix table or other method. At the appropriate time, the provider representative may be prompted by Prompt Box 310, as shown in FIG. 5. The incentive matrix may calculate an optimal set of incentives that may be used to retain the customer. Factors for consideration may include the customer segment, behavior segment value, credit bureau score, profitability score, attrition score, delinquency days and other considerations. Further, information related to the customer's product information may also be considered. This information may include customer demographics and card specific information. Also, the customer's call type may also provide insight into the customer's expectations and goals. These factors and other pertinent information may then be used to formulate an optimal set of incentives that may be offered to the customer for customer retention.

In addition, restrictions or other limitations may be placed on the list of possible incentives to preserve profitability to the provider. For example, after assessing the customer's segmentation and other factors, it may be less profitable to attempt to retain a customer who has been delinquent on several payments. The system may institute threshold factors to determine various grades of delinquency. For example, if another customer was delinquent on one payment by two days several months ago, there is a strong possibility that this customer may serve as a profitable customer. Also, incentive restrictions may be based on a caller's account role as primary, secondary, authorized user or third party.

As displayed in Incentives Group 522, possible incentives categories may include APR contract with no introductory; APR contract with introductory; balance transfers with introductory; balance transfers with introductory and goto; balance transfers with contract base; non automated fulfillment; balance transfer contingency; fee waivers (e.g., lifetime, partial or full waivers); credit line increase, balance transfer introductory extension and other incentives. Upon selecting an incentive group, available incentives within that group may be displayed and offered to the customer, as shown by Available Incentives 524. For example, when the incentive group directed to APR contract with no introductory is selected, available incentives may include specific percentages, such as 11.9% Contract APR, 10.9% Contract APR, 9.9% Contract APR, and 8.9% Contract APR. Other percentages and variations may also be offered to the customer, based on customer eligibility.

The customer's incentive eligibility rating may be displayed in Incentive Rating box 530. This indicates to the provider representative which groups of incentives are most profitable to the provider. For example, the incentive eligibility ratings may be displayed in a color-coded manner where red signifies a negative incentive and green signifies a favorable incentive. Other color schemes and symbols may also be used. In this example, the customer is more eligible for Balance Transfer, APR, and Promotional incentives, as indicated by two green circles. According to another embodiment of the present invention, incentives that the customer are not eligible for may be removed from the list of options. Eligibility may be based on profitability, risk of flight, and other factors.

Account Information box 312 may display the customer's account number and personal information, such as primary customer name, address, home phone number, and other information. Account information may include the current balance, current credit line, available credit, merchandise APR, cash APR and other account related information. Card Information box 314 may include an open date; status (e.g., active, inactive); product; level; association; expiration date; and other card related information. Card type may include the categories, such as merchants, services, etc. For example, card types may include Internet Service Providers; Airline affiliated cards; Merchants, such clothing stores, music stores, Universities and others. The type of card may indicate customer demographics and other attributes. At any time, the provider representative may delete the case, defer the action, or finish the offer by selecting the appropriate buttons 540, 542, and 544. Other operations may also be available.

Figure 6:
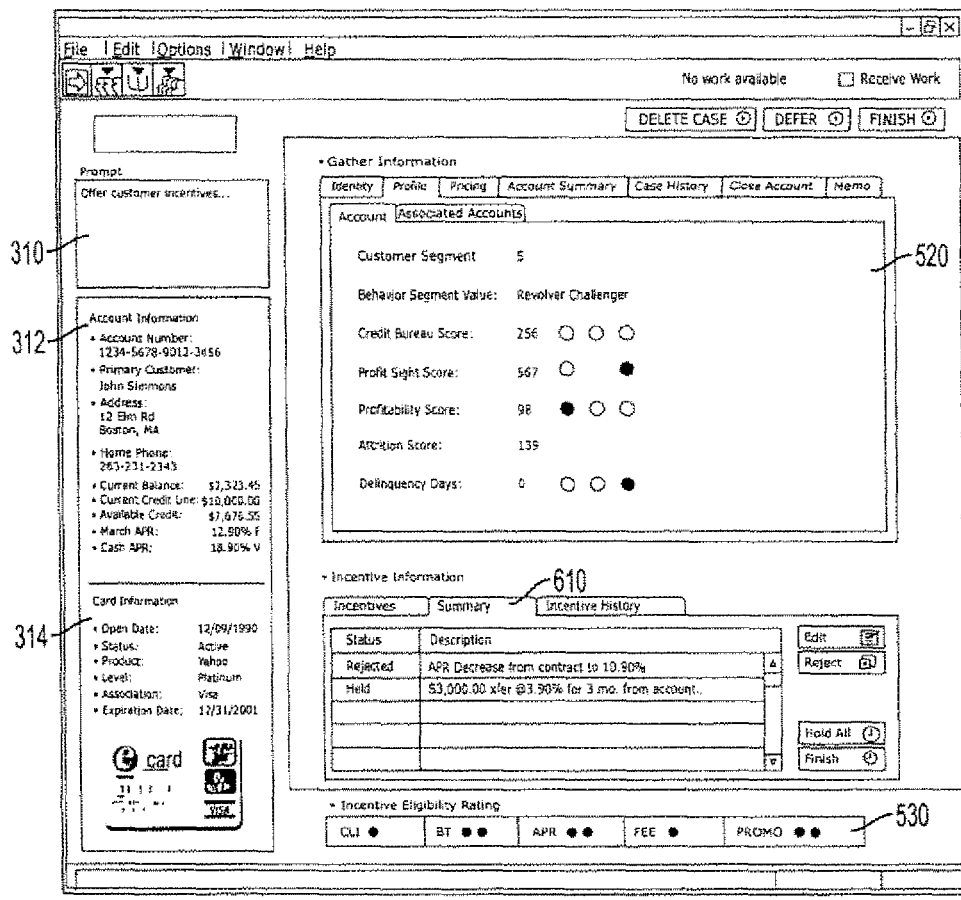
FIG. 6 illustrates an example of a GUI containing incentive summary information in accordance with an embodiment of the invention.
Figure 7:
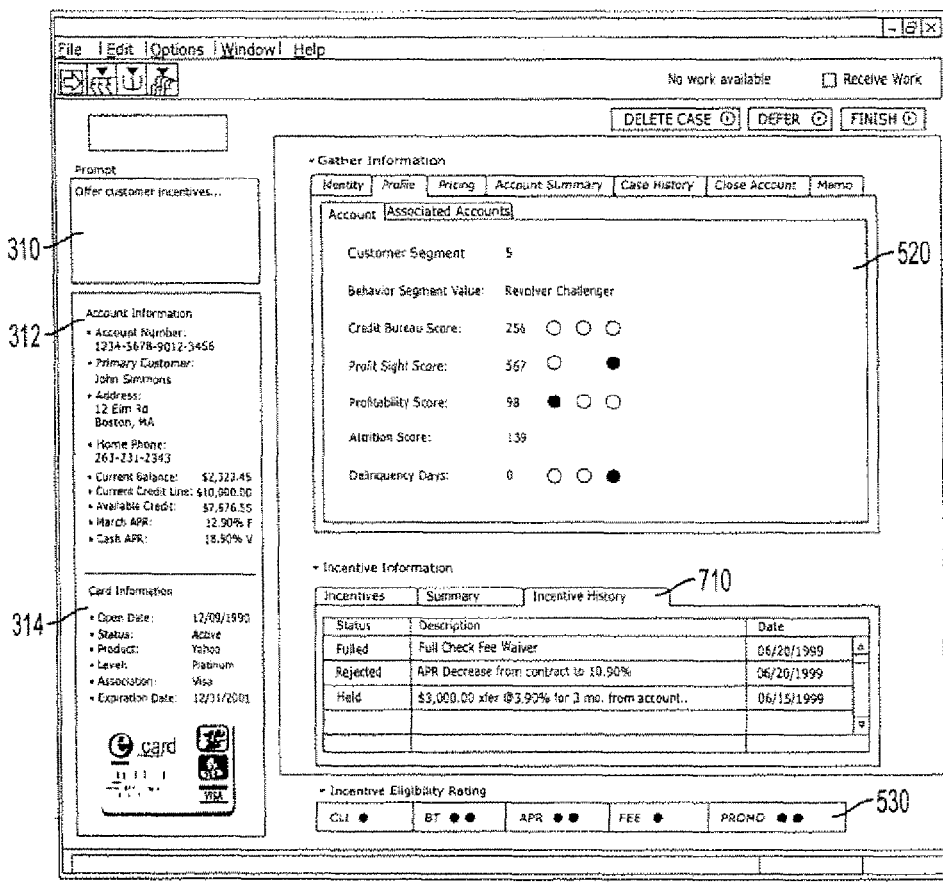
FIG. 7 illustrates an example of a GUI containing incentive history information in accordance with an embodiment of the invention.

Other incentive information may also be utilized by the provider representative, as illustrated by FIG. 6 and FIG. 7. Summary Tab 610 may display a description of incentives and the status of each incentive. Incentive Tab 710 may display the status, description and date of each incentive presented to the customer. This enables the provider representative to assess the success and failures of previous presentments of similar or related incentives. Thus, this historical information may assist the provider representative in selecting an appropriate incentive to the customer.

Referring to step 218, one or more incentive may be offered to the customer. Any additional calculations may also be performed (e.g., CLI amount). The customer may respond by accepting, rejecting, or placing the action on hold. Other responses are possible. If the customer accepts the incentive, at step 220, a provider representative may review the selected one or more incentives with the customer, at step 224. At this step, the accepted incentives are discussed with the customer for understanding and clarification. This discussion also provides the customer with the ability to make further changes or deletions. A fulfillment process at step 226 may also be performed. This process may involve sending information to a mainframe to fulfill the accepted incentive. A confirmation letter and other information may also be sent to the customer. However, if the customer rejects the incentives, the provider representative may offer alternative opportunities, at step 222. This process may be repeated as needed or until the customer decides to terminate the call or until the provider representative determines that it is no longer profitable to retain the customer. Also, the customer may place one or more offers on hold and return after further consideration. For example, the customer may want to discuss the one or more offers with family member, business partners, etc. Also, the customer may want to shop around for better incentives.

Figure 8:
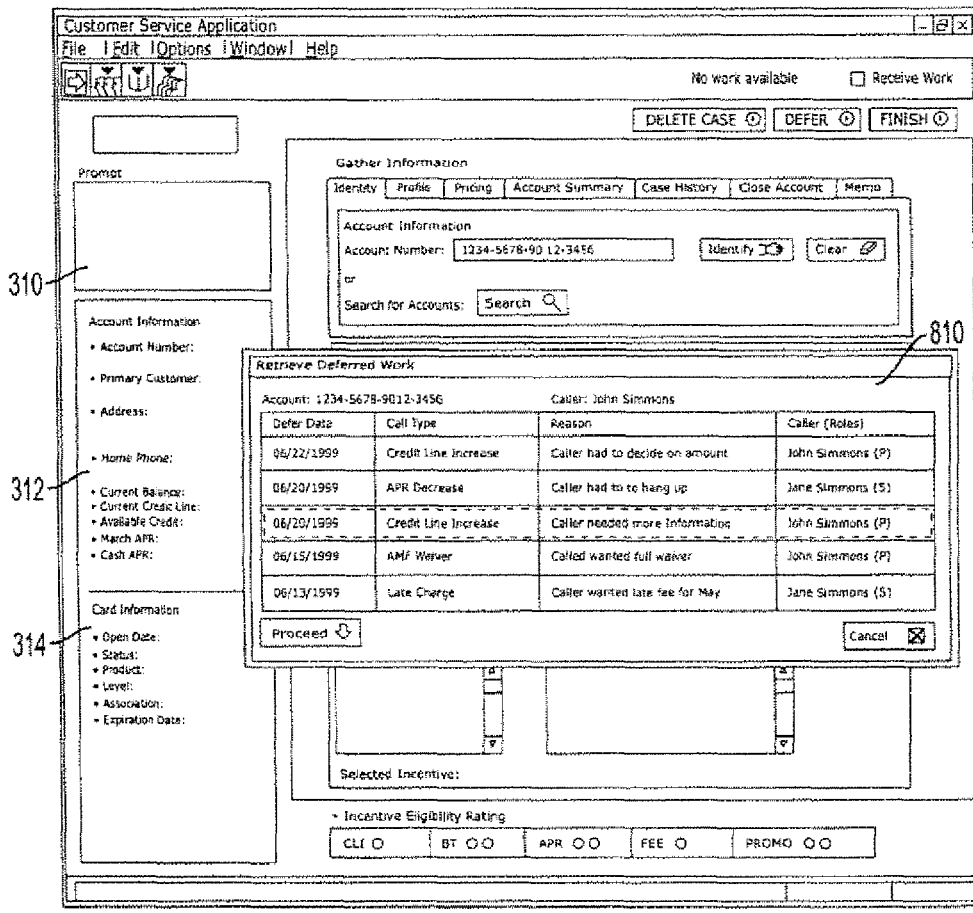
FIG. 8 illustrates an example of a GUI containing deferred work retrieval information in accordance with an embodiment of the invention.

According to another embodiment of the present invention, deferred work may be retrieved by a provider representative, as shown by FIG. 8. Deferred Work box 810 displays a list of calls that have been identified as deferred. The defer date, call type, reason, caller and other information may be displayed. When a deferred work is selected, the account may be retrieved and operations may be resumed.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the scope of the invention. For example, for clarity, the invention is described in terms of a financial institution. It is to be understood, however, that the invention may also be utilized with a plurality of financial institutions or other product or service providers who each offer a plurality of products or services to customers through the system and method of the invention.

What is claimed is:

1. A computer implemented method for providing one or more tailored incentives to a customer in response to a customer request, the computer implemented method comprising the steps of:
   receiving a request from a customer, wherein the request is received by a provider or provider representative;
   retrieving account data associated with the customer in response to the request where the account data is displayed on a graphical user interface, wherein the account data is verified for the customer;
   identifying the request as a request type from a list of predetermined request types, at a type module, where the request type identifies the customer's current situation;
   identifying the customer as a customer segment, at a customer segment module, where the customer segment identifies the customer's past behavior;
   identifying one or more incentives, at an incentive module, based on the request type, the customer segment and one or more profitability factors associated with the provider of the one or more incentives; and
   offering the customer at least one of the identified one or more incentives for retaining the customer in response to the request, wherein the request is a request to terminate a relationship with the provider;
   wherein the steps of identifying the request as a request type, identifying the customer as a customer segment and identifying one or more incentives are performed in response to the step of receiving a request from a customer; and
   wherein the one or more incentives comprises at least one product or service offered by a financial institution.

2. The method of claim 1, wherein the step of identifying the customer as a customer segment, further comprises the step of:
   assigning a value to the customer based on at least one of customer payment history, customer payment habit, customer behavior data and credit bureau score.

3. The method of claim 1, wherein the step of identifying the customer as a customer segment, further comprises the step of:
   considering information related to at least one of customer delinquency data and customer attrition data.

4. The method of claim 1, further comprising the step of:
   offering the customer another one of the identified one or more incentives for retaining the customer in response to the request.

5. The method of claim 1, wherein the step of identifying one or more incentives further comprises the step of:
   applying one or more restrictions on the one or more incentives based on the one or more profitability factors.

6. The method of claim 1, wherein the request comprises one or more of a telephone call and Internet communication.

7. The method of claim 1, wherein the one or more profitability factors comprise one or more of customer payment delinquency and customer ability to pay.

8. The method of claim 1, wherein the step of identifying the request further comprising the step of:
   identifying a product associated with the customer, wherein the one or more incentives comprises an adjustment to the product.

9. A computer implemented system for providing one or more tailored incentives to a customer in response to a customer request, the computer implemented system comprising:
- a graphical user interface that displays account data associated with a customer, in response to a request from a customer, wherein the request is received by a provider or provider representative and wherein the account data is verified for the customer;
- a type module for identifying the request as a request type from a list of predetermined request types, where the request type identifies the customer's current situation;
- a customer segmentation module for identifying the customer as a customer segment, where the customer segment identifies the customer's past behavior; and
- an incentive module for identifying one or more incentives based on the request type, the customer segment and one or more profitability factors associated with the provider of the one or more incentives and wherein the customer is offered at least one of the identified one or more incentives for retaining the customer in response to the request, wherein the request is a request to terminate a relationship with the provider;
- wherein identifying the request as a request type, identifying the customer as a customer segment and identifying one or more incentives are performed in response to receiving a request from a customer; and
- wherein the one or more incentives comprises at least one product or service offered by a financial institution.

10. The system of claim 9, wherein the customer is assigned a value based on at least one of customer payment history, customer payment habit, customer behavior data and credit bureau score.

11. The system of claim 9, wherein the customer segmentation module considers information related to at least one of customer delinquency data and customer attrition data.

12. The system of claim 9, wherein the customer is offered another one of the identified one or more incentives for retaining the customer in response to the request.

13. The system of claim 9, wherein one or more restrictions is applied on the one or more incentives based on the one or more profitability factors.

14. The system of claim 9, wherein the request comprises one or more of a telephone call and Internet communication.

15. The system of claim 9, wherein the one or more profitability factors comprise one or more of customer payment delinquency and customer ability to pay.

16. The system of claim 9, wherein the request module further identifies a product associated with the customer, wherein the one or more incentives comprises an adjustment to the product.

* * * * *